June 15, 1937.　　　R. FELLOM　　　2,083,643
WHEELED EARTH GRADER AND CARRIER
Filed Aug. 30, 1935　　　2 Sheets-Sheet 1
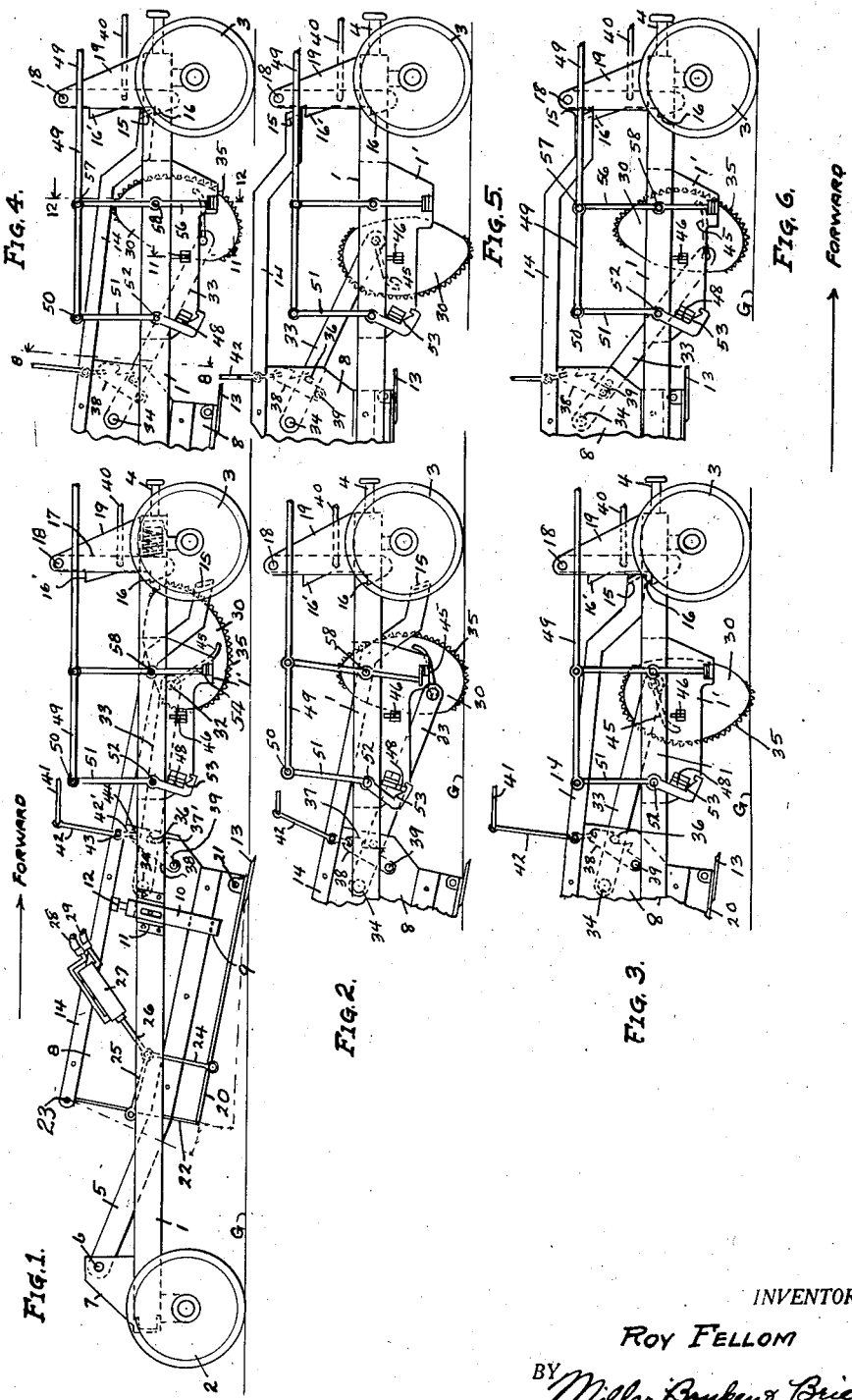
INVENTOR.
Roy Fellom
BY Miller Boyken & Bried
ATTORNEY.

June 15, 1937.   R. FELLOM   2,083,643
WHEELED EARTH GRADER AND CARRIER
Filed Aug. 30, 1935   2 Sheets-Sheet 2
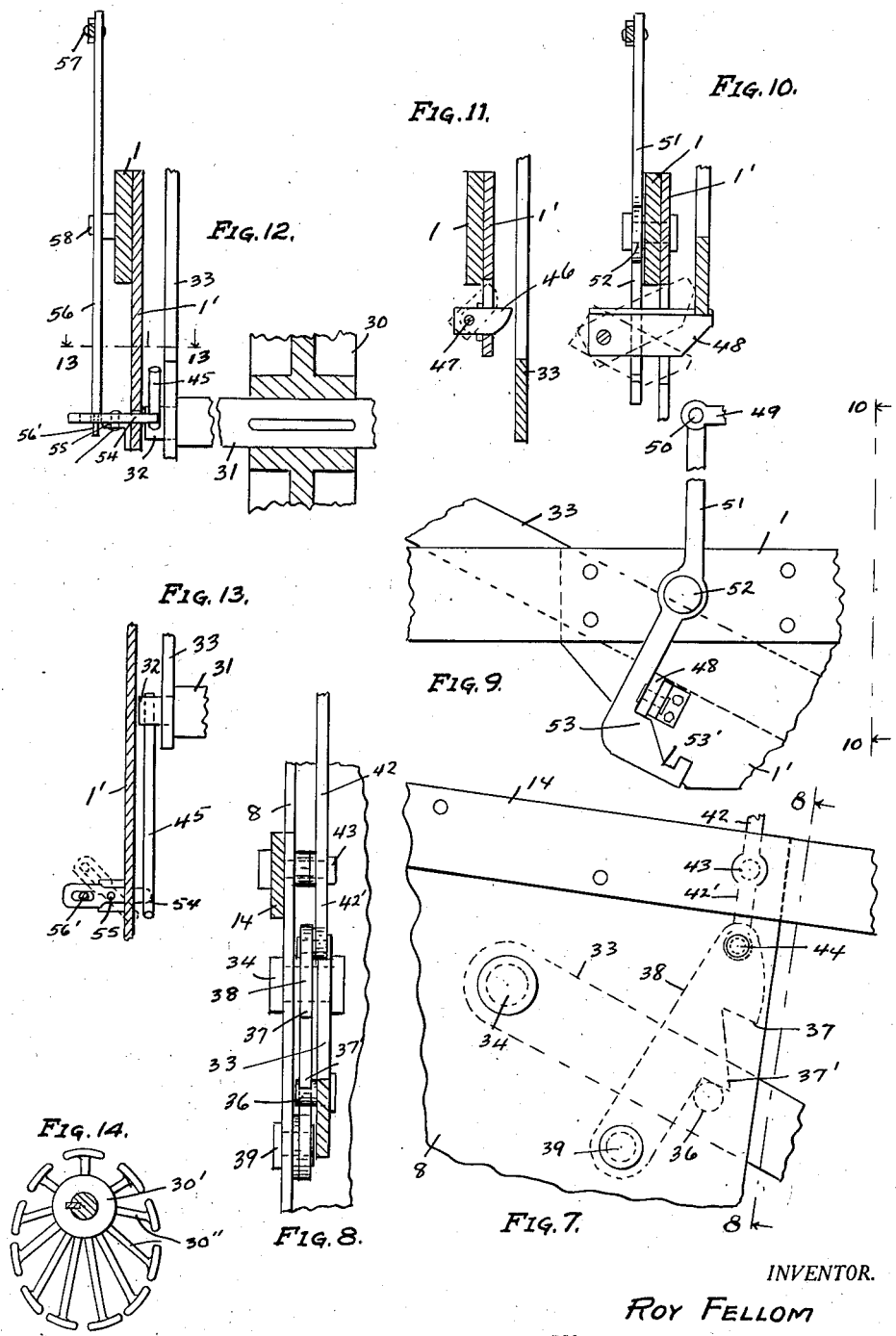
INVENTOR.
ROY FELLOM
BY Miller Boyken & Bried
ATTORNEY.

Patented June 15, 1937

2,083,643

UNITED STATES PATENT OFFICE 2,083,643

WHEELED EARTH GRADER AND CARRIER

Roy Fellom, San Francisco, Calif.

Application August 30, 1935, Serial No. 38,556

15 Claims. (Cl. 37—128)

This invention relates to scrapers, graders or dirt movers, particularly of the type used for grading, building roads or regrading roads, and the principal object of the invention is to provide a wheeled grader with improved means for controlling the movements of the bucket from cutting to carrying position; also such means which will be powered by contact with the ground during forward movement of the grader in a manner to raise the filled bucket with a cam-like action, also which will raise the bucket successively to greater heights as the ground power mechanism is actuated. Other features and advantages of the invention will appear in the following description and accompanying drawings.

Briefly described the invention may be said to consist of the combination of a wheeled vehicle adapted to be drawn along by a tractor or draft animals, and on which vehicle is pivotally mounted a scraper bucket which may be lowered and raised to and from digging position, and means for raising the bucket taking the form of a wide-faced rim cam pivotally mounted on an auxiliary frame or set of arms in a manner so that it may be dropped to engage the surface of the ground and be turned or rolled on its cam surface as the vehicle moves forward, and thereby raise its arms, and through suitable latches and ratchets lift the bucket as the high part of the cam is carried under in contact with the ground. The arrangement of ratchets and latches is such as to raise the bucket an additional height if the earth cam is again actuated.

In the drawings Fig. 1 is a side elevation of my improved grader shown with bucket dropped to cutting or digging position and actuating cam raised.

Fig. 2 is a fragmentary side elevation of the machine showing the cam dropped to contact the ground.

Fig. 3 is a similar view to that of Fig. 2 but showing the cam revolved by contact with the ground to its highest point.

Fig. 4 is similar to Fig. 3 but shows the cam revolved to overbalanced position ready to be dropped again.

Fig. 5 shows the bucket elevated to the highest position due to a second revolution of the cam.

Fig. 6 shows the cam again raised from the ground and turned to overbalanced position.

Fig. 7 is an enlarged fragmentary elevation of a portion of Fig. 5 more clearly showing the ratchet hooks on the bucket for successive engagement by the cam arms.

Fig. 8 is a vertical section of Fig. 7 as seen from the line 8—8 thereof (and 8—8 of Fig. 4).

Fig. 9 is an enlarged fragmentary elevation of a portion of Fig. 5 more clearly showing the latch arrangement which supports the cam arms in raised position.

Fig. 10 is an end view of Fig. 9 as seen from line 10—10 thereof.

Fig. 11 is an enlarged vertical section of portion of Fig. 4 taken along the line 11—11 thereof showing the cam turning latch pin.

Fig. 12 is an enlarged vertical section of portion of Fig. 4 taken along the line 12—12 thereof showing the latch which holds the cam in elevated position.

Fig. 13 is a horizontal section of portion of Fig. 12 looking downward.

Fig. 14 shows a modified form of the ground cam.

In further detail the construction shown in the figures embraces a suitable supporting road vehicle comprising a main frame preferably horizontally disposed and supported on rear and forward road wheels 2 and 3 respectively. There may be two rear wheels and one or two front wheels suitably swivelly mounted to permit the vehicle turning when drawn forward (in direction of the arrow) by a tractor coupled to the hitch bar 4. The frame of the vehicle includes two spaced side members or beams 1 suitably joined at opposite ends by transverse members indicated, and between the side members 1 is positioned an open front digging bucket suspended on arms 5 pivoted at their rearward ends at 6 to brackets 7 secured to the vehicle frame.

Arms 5 are rigidly secured to the sides 8 of the bucket, and in the lowered or digging position of the bucket these arms rest against inwardly turned toes 9 of brackets 10 which are slidably carried by the vehicle frame in suitable mountings 11 and adjustable up and down as by screws 12 for controlling the lowermost position of the bucket and its cutting teeth or edge 13, while along the upper edges of the bucket sides 8 is secured a pair of arms 14 which extend considerably beyond the forward end of the bucket and are joined as by a cross piece 15 which is adapted to engage successively a series of steps or ratchet teeth 16, 16' of a swingingly suspended ratchet bar 17 pivotally mounted at its upper end at 18 to suitable pedestals or uprights 19 secured to the vehicle frame.

In Figs. 3 and 4 the transverse member 15 of the bucket arms 14 is shown engaging the first or lower step 16 of the swingingly suspended ratchet bar and with the bucket raised from digging position, while in Figs. 5 and 6 the bucket is shown raised still higher and the arms resting on a higher ratchet tooth 16'. Any number of ratchet teeth for various stages of elevation of the bucket may be used.

The bucket is freely spaced within the frame for the up and down movement and it may have any desired manual or mechanical arrangement for discharging the load, as this feature is apart from the present invention, though for the purpose of completing the showing, is here indicated by the bottom 20 of the bucket being pivoted at its forward end at 21 to the sides 8, and the rear wall 22 pivoted at its upper end at 23 to the side walls, so as to form outwardly opening doors, and both doors are suitably linked as at 24, 25 to the plunger 26 of a fluid power cylinder or cylinders 27 carried on the side or sides of the bucket and arranged with fluid actuating hose tubes 28, 29 for remote control from the tractor operator in the manner well understood in the art.

The ground cam which raises the bucket when desired is shown at 30 and is firmly secured to a transversely extending shaft 31 reduced at its ends 32 and revolvably projecting through bearing openings in a pair of rearwardly extending arms 33 pivoted at their rear ends at 34 to the inner sides of the side walls 8 of the bucket so that the cam may rise and fall with these arms as the cam rolls along the ground.

Instead of a continuous rim cam being used as shown in Figs. 1 to 6, the same result can be secured with a cam as shown in Fig. 14 wherein a central hub 30' is provided with radiating spokes 30'' of varying length to in effect form the cam. Toes may or may not be used on the outer ends of the spokes.

But one wide-faced cam is shown, though there may be any number secured to the shaft 31, and the face of the cam is preferably formed with ground engaging teeth or pins 35 along its active surface—i. e. that portion which will grip the ground and carry the cam over the "highest" point (or lowest with respect to the ground as shown in Figs. 3 and 5) when the cam is dropped to ground engaging position. Normally the cam is lifted to inactive position as shown in Figs. 1, 4, and 6 until desired to raise the bucket when the cam is dropped to ground engaging position, all as will be described, though it is evident that instead of lifting it clear of the ground when inactive, it can simply drag on its smooth side after going over the high portion. After the cam has been lowered to grip the ground at its shortest throw as shown in Fig. 2 a pair of pins 36 projecting from the sides of arms 33 engage under teeth 37, 37' formed on ratchet hooks 38 pivoted at their lower ends at 39 to the inner sides of the bucket, and thereby raise the bucket as the cam revolves and the forward end of the bucket arms engages over the lowermost tooth 16 of ratchet bar 17 as shown in Figs. 3 and 4, while the next time the cam is actuated as described the pins 36 engage under lower teeth 37' of ratchet hook 38 and lift the bucket still higher to be supported by the upper tooth 16' of ratchet bar 17 as described. To release ratchet bar 17 from the bucket arm member 15 a pull link or rod 40 is provided which extends to any convenient point for operation, such as to the hauling tractor, not shown, while to release or engage ratchet hook 38 a similar rod 41 is provided, but pivotally connects to a lever 42 pivoted at 43 to the bucket side and the short end 42' of which lever is pivotally connected at 44 with hook 38.

In order to revolve the cam after it has passed over its greatest throw (Fig. 3) to the position of Figs. 4 or 6, there is provided at one or both ends of shaft 31 a curved arm 45, and which, due to the weight of the free ends of arms 33 as they fall from position of Figs. 3 or 5 to position of Figs. 4 or 6, is revolved with the cam and shaft in a manner to drag the curved arm 45 over a latch pin 46 projecting across the path of the curved arm and thereby forcing the cam to revolve and lift itself from the ground. Latch pin 46 is carried on an auxiliary frame member 1' extending from the vehicle frame 1 and is pivoted thereto as at 47 (see Fig. 11) so that it will lift out of the way of curved arm 45 in coming up but will engage thereover when about to descend (from position of Fig. 5) as the cam goes over.

To hold the cam arms elevated and the cam clear of the ground two latches are provided, one, 48, (at each side of the frame) which falls under the cam arm 33 to support it until released by pulling on a rod 49 pivotally connected at 50 with a lever 51 pivoted at 52 to the frame 1 and provided with a toe portion 53 which normally engages under the latch to support the same, but which, when the rod is pulled forwardly, permits the latch to drop into a lower notch 53' and assume the lower dotted position of Fig. 10 so as to clear the arm 33 or returns the latch to full line position when shoved back, though leaving it free to rise out of the way of the cam arm as indicated in the highest dotted position of Fig. 10. The other latch required is a simple one at 54 pivoted to a bracket at 55 (see Fig. 13) to swing horizontally into or out of the path of curved arm 45 so as to come under it (as in Figs. 4 and 6) and thereby hold the cam from falling over center very far due to its momentum when carried around by the descent of arms 33. This latch is simultaneously operated with latch 48 by rod 49 through means of another lever 56 pivoted at 57 to the rod, at 58 to the vehicle frame 1 and with its lower end 56' working in a slot in the latch 54 outward of its pivot 55.

It is of course understood that the various latches, ratchets, control rods and levers may be duplicated at both sides of the machine and suitably hooked together for simultaneous operation; also that various modifications in details of the levers, latches and other features may be made without departing from the spirit of the invention and scope of my appended claims.

Attention is also called to the fact that while my ground cam arrangement for lifting the load upon forward movement of the vehicle, or successive lifting of it to any height by successive revolutions of the ground cam, has particular value in a road grader as shown in the drawings, it also has use for lifting or tilting any dump vehicle body for rear discharge like the grader bucket, as this bucket when full of dirt and elevated somewhat may be considered a mere carrying truck and may be forced up higher in front to dump at the rear by further applications of the lifting cam to the ground. The height to which it may be forced depends only on the length of the ratchet bars 17 and 38 and number of teeth thereon.

Referring to Figs. 1 to 6, the operation, in brief, is as follows:

When the bucket is in digging position (Fig. 1) the vehicle is moved forward in the direction of the arrow until the bucket is filled with earth. Without stopping the vehicle the operator pulls rod 49 forwardly thereby actuating latches 53, 54 to release arms 33 for dropping at their forward ends about pivots 34 connecting their rear ends to the bucket. Cam 30 drops with the arms thus engaging the ground, whereupon the forward movement of the vehicle causes the cam to rotate to progressively elevate the forward ends of the arms, and as the ratchet connection 36, 38 between the arms and bucket precludes the arms pivoting upwardly relative to the bucket, the forward end of the bucket is elevated clear of the ground and rigid arms 14 with their cross piece 15 are likewise raised with the bucket until the cross piece engages over lower tooth 16 of ratchet bar 17 at which time the high portion of the cam passes from the ground and the arms 31 commence to fall again toward latches 53, 54. The cam is now in dragging relation to its mounting, instead of a thrust relation thereto, and while the arms 33 are descending but before they again engage latch 53, the arm 45 that is connected with the cam for rotation therewith engages a latch pin that causes the cam to quickly rotate to a position free of the ground and to swing arm 45, over against latch 54 so that the "low point" of the cam is spaced above the ground and the cam is "set", as it were, for repeating the foregoing cycle, but now with the bucket elevated above the ground.

The operator now pulls rod 49, if desired to further elevate the bucket, and ratch connection 36, 38 becomes effective between arms 33 and the bucket to permit the lowered cam to raise the bucket, and cross piece 15 to a still higher position where cross piece engages over upper tooth 16' on the ratchet bar 17, and again, when the high point of the cam is passed, the arms 33 and cam are again operated by falling of the arms to the position with the cam free of the ground, but ready to repeat the cycle of operation.

The load is dumped by the operator actuating the hydraulic cylinder 27 to move links 24 to 26 for permitting the bottom 20 and rear end 22 of the bucket to pivot on pivots 21, 23, and reverse actuation of the links through the hydraulic cylinder will close the bucket again preparatory to refilling.

To resume digging, the operator pulls rod 40 thus releasing the ratchet bar 17 from supporting the cross piece 15 and bucket, whereupon the bucket drops to digging position and the cycle of operation again is commenced.

I particularly intend that my claims cover such a ground cam arrangement broadly on any kind of a tiltable container carried by a vehicle and whether the same be self-powered or drawn along by power or otherwise.

I claim:

1. In a wheeled grader of the character described, a scraper bucket pivotally mounted for lowering and raising to and from digging position, a rim cam adapted to contact the ground for turning over during the forward movement of the grader, means for transmitting power from the cam as it revolves for raising the bucket comprising a lever arm pivotally mounted on the grader and pivotally carrying the rim cam on its free end, means for sustaining the bucket in raised position, and means for maintaining the cam inactive when desired.

2. In a wheeled grader of the character described, a scraper bucket pivotally mounted for lowering and raising to and from digging position, a rim cam adapted to contact the ground for turning over during the forward movement of the grader, means for transmitting power from the cam as it revolves for raising the bucket successively further upon each revolution of the cam, and means for sustaining the bucket in raised position.

3. In a wheeled grader of the character described, a scraper bucket pivotally mounted for lowering and raising to and from digging position, a rim cam adapted to contact the ground for turning over during the forward movement of the grader, means for transmitting power from the cam as it revolves for raising the bucket comprising a pair of arms pivotally connected to the bucket at their rearward ends and pivotally mounting the cam at their forward ends, and cooperating engaging means on the bucket and arms adapted to mutually engage for lifting the bucket as the arms rise.

4. In a wheeled grader of the character described, a scraper bucket pivotally mounted for lowering and raising to and from digging position, a rim cam adapted to contact the ground for turning over during the forward movement of the grader, means for transmitting power from the cam as it revolves for raising the bucket comprising a pair of arms pivotally connected to the bucket at their rearward ends and pivotally mounting the cam at their forward ends, cooperating engaging means on the bucket and arms adapted to mutually engage for lifting the bucket as the arms rise, and means for releasing said engaging means by remote control.

5. In a wheeled grader including a frame supported on ground wheels and a scraping bucket pivotally mounted on the frame for raising and lowering its digging edge, cam means carried by the vehicle adapted to contact the ground for revolving thereby as the vehicle moves forward, and means operated by the revolving of said cam means arranged to lift the bucket on its pivotal support, said bucket provided with a forwardly extending arm, and means on the frame arranged to engage said arm to hold the bucket elevated.

6. In a wheeled grader including a frame supported on ground wheels and a scraping bucket pivotally mounted on the frame for raising and lowering its digging edge, cam means carried by the vehicle adapted to contact the ground for revolving thereby as the vehicle moves forward, and means operated by the revolving of said cam means arranged to lift the bucket on its pivotal support, said bucket provided with a forwardly extending arm, and remote control ratchet means on the frame arranged to engage said arm to hold the bucket elevated.

7. In a wheeled grader including a frame supported on ground wheels and a scraping bucket pivotally mounted on the frame for raising and lowering its digging edge, cam means carried by the vehicle adapted to contact the ground for revolving thereby as the vehicle moves forward, and means operated by the revolving of said cam means arranged to lift the bucket on its pivotal support, said bucket provided with a forwardly extending arm, and remote control ratchet means on the frame arranged to engage said arm to hold the bucket elevated, and remote control means for holding said cam means inactive.

8. In a construction as specified in claim 5, side arms pivoted to the bucket extending forwardly and pivotally mounting said cam means, and means actuated by the weight of said arms for turning the cam means and lifting it from the ground after it has raised the bucket, ready for recycling as described.

9. In a construction as specified in claim 5, side arms pivoted to the bucket extending forwardly and pivotally mounting said cam means, means actuated by the weight of said arms for turning the cam means and lifting it from the ground after it has raised the bucket, ready for recycling as described, and remote control means for controlling the recycling of said cam means.